Patented May 29, 1928.

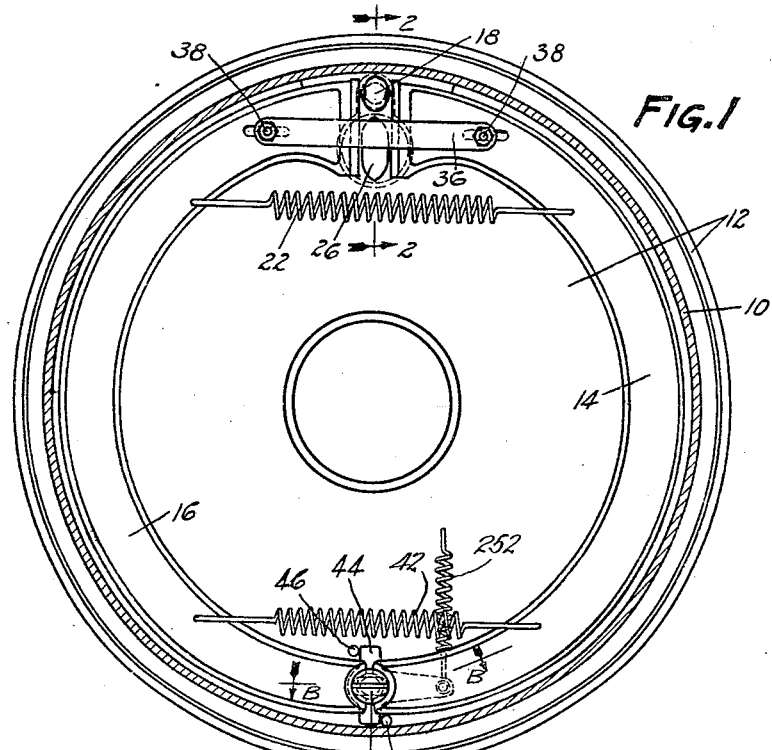
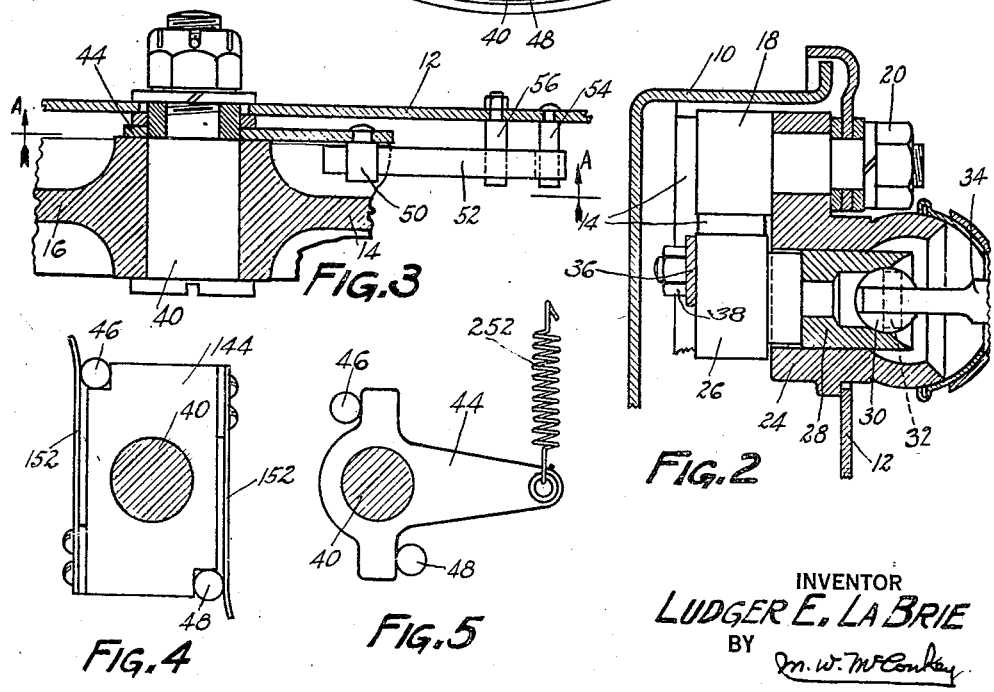

1,671,645

UNITED STATES PATENT OFFICE.

LUDGER ELIZÉ LA BRIE, OF SOUTH BEND, INDIANA, ASSIGNOR TO BENDIX BRAKE COMPANY, OF CHICAGO, ILLINOIS, A CORPORATION OF ILLINOIS.

INTERNAL BRAKE.

Application filed August 12, 1925. Serial No. 49,738.

This invention relates to brakes, and is illustrated as embodied in an automobile front wheel brake. An object of the invention is to provide a simple arrangement of "double-wrapping" or "duo-servo" brake including a novel anchor and an improved expanding device at the ends of the floating friction device.

In one desirable arrangement, the anchor is between those ends and may be adjusted to take up for wear; for example the anchor may be a stationary cam which can be turned and locked in any adjustable angular position. I prefer to mount a swinging support on the anchor, and one feature of the invention relates to providing this support with a double cam or an equivalent expanding device floating with the support.

It is best to connect the expanding device with the brake-applying shaft through a universal joint, which permits the swinging of the support as the friction device anchors at one end or the other. When the brake is used for a front wheel, this same universal joint is arranged in the swivelling axis of the wheel, to permit steering the wheel when the brake is on.

An important feature of the invention relates to providing a lever rocked by the shifting of the friction device to tension a spring, the spring acting when the brake is released as automatic centering means. In the arrangement illustrated, the friction device includes a plurality of shoes, and the lever is carried by the floating pivot connecting the shoes.

These and other objects and features of the invention, including various novel combinations of parts and desirable particular constructions, will be apparent from the following description of the illustrative embodiments shown in the accompanying drawing, in which:

Fig. 1 is a vertical section through the brake, just inside the wheel;

Fig. 2 is a vertical section on the line 2—2 of Fig. 1, showing the brake-applying means;

Fig. 3 is a horizontal section on a line corresponding to the line B—B of Fig. 1, but showing the lever and spring arrangement with a leaf spring;

Fig. 4 is a vertical section through a modification, on a line corresponding to the line A—A in Fig. 3, and showing a different lever and spring arrangement; and Fig. 5 is a view corresponding to Fig. 4, but showing the lever and spring arrangement of Fig. 1.

In the arrangement of Figs. 1–3, the brake includes a drum 10 and a backing plate 12, between which is arranged a floating friction device comprising arcuate shoes 14 and 16, which are preferably identical and interchangeable.

Between the free ends of the shoes is an anchor, shown as a double cam 18, which can be turned to take up for wear of the brake lining, and then locked by a nut 20. A return spring 22 urges the shoes against the cam.

A support or bracket 24 is pivotally mounted on a spindle portion of cam 18, so that it can swing in either direction. This support carries a double brake-applying cam 26, secured on a short shaft 28 journalled in the support. Shaft 28 has a cross bore in its end for a pair of outwardly cylindrical connecting members 30, between which a pin 32 pivots the flattened end of a brake-applying shaft 34.

Connecting members 30 and pin 32 form a universal joint permitting support 24 to swing with cam 26, as one or the other of shoes 14 or 16 anchors against cam 18. When the brake is on a front wheel, this universal joint is arranged in the swivelling axis of the wheel, to allow for steering movement. A plate 36 carried by posts 38 passing through slots in the shoes serves to position the free ends of the shoes laterally.

The floating joint between the shoes is illustrated as comprising a pivot pin 40 passing through a slot in the backing plate, and against which the shoes are held by a spring 42. On this pivot pin is mounted a three-arm lever 44, having an upper arm engaging a stationary stop 46, a lower arm engaging a stop 48, and a lateral arm carrying a pin 50 which in Fig. 3 is engaged by a leaf spring 52 holding the upper and lower arms against the stops.. Spring 50 is carried by a pin 54 on the backing plate, and its tension may be varied by an adjustable pin 56.

If now the drum is turning clockwise when the brake is applied, the upper arm of lever 44 is rocked by stop 46; if it is turning counterclockwise the lower arm of lever 44 is rocked by a stop 48; in either case the lever turns clockwise against the resistance of spring 52.

In the modification of Fig. 4, lever 144 carries two leaf springs 152 engaging the stops 46 and 48, and one or the other of which is tensioned by the rocking of the lever. In Figs. 1 and 5, a coil spring 252 is substituted for the leaf spring 52.

While several illustrative embodiments have been described in detail, it is not my intention to limit the scope of the invention to those particular embodiments, or otherwise than by the terms of the appended claims.

I claim:

1. A brake comprising, in combination, a drum, an expansible floating friction device within the drum arranged to anchor at one end when the drum is turning in one direction and at the other end when the drum is turning in the other direction, anchoring means engaged by both ends of said device when the brake is not applied and by one end only when the brake is applied, and means for adjusting the anchoring means to vary the clearance between said device and the drum when the brake is not applied.

2. A brake comprising, in combination, a drum, an expansible floating friction device within the drum arranged to anchor at one end when the drum is turning in one direction and at the other end when the drum is turning in the other direction, an adjustable anchor between the ends of said device, means also between the ends of said device and arranged to force them apart against the drum, and means holding both ends of said device against the anchor when the brake is not applied, the adjustment of the anchor serving to vary the clearance between the friction device and drum when the brake is not applied.

3. A brake comprising, in combination, a drum, an expansible floating friction device including a plurality of shoes, within the drum arranged to anchor at one end when the drum is turning in one direction and at the other end when the drum is turning in the other direction, anchoring means engaged by both shoes when the brake is not applied and by one or the other of said shoes when the brake is applied, and which is adjustable to vary the clearance between the shoes and drum when the brake is not applied, and a floating expanding device engaging the ends of the friction device.

4. A brake comprising, in combination, a drum, an expansible floating friction device including a plurality of shoes within the drum arranged to anchor at one end when the drum is turning in one direction and at the other end when the drum is turning in the other direction, anchor cam means engaged by both shoes when the brake is not applied and by one only of the shoes when the brake is applied, means to adjust the cam means to take up for wear and preserve the desired clearance between the shoes and drum when the brake is not applied, and means to hold the cam means in any desired adjusted angular position.

5. A brake comprising, in combination, a drum, an expansible floating friction device including two different anchoring parts within the drum arranged to anchor on one of said parts when the drum is turning in one direction and on the other of said parts when the drum is turning in the other direction, stationary anchoring means engaged by both of said parts when the brake is not applied and by one part only when the brake is applied, said anchoring means being adjustable to take up for wear and preserve the desired clearance between the friction device and drum when the brake is not applied, and being constructed and arranged to be held in any desired adjusted position, and a brake-expanding floating device engaging the ends of the friction device.

6. A brake comprising, in combination, a drum, an expansible floating friction device within the drum arranged to anchor at one end when the drum is turning in one direction and at the other end when the drum is turning in the other direction, a stationary anchor member between the ends of said device, and a swinging brake-expanding device supported by the anchor member.

7. A brake comprising, in combination, a drum, an expansible floating friction device within the drum arranged to anchor at one end when the drum is turning in one direction and at the other end when the drum is turning in the other direction, a stationary anchor member between the ends of said device, a support oscillatably mounted on the anchor member, and a brake-expanding device carried by the support.

8. A brake comprising, in combination, a drum, an expansible floating friction device within the drum arranged to anchor at one end when the drum is turning in one direction and at the other end when the drum is turning in the other direction, a stationary anchor between the ends of the friction device, a support mounted to swing about an axis passing through the anchor, and a brake-expanding device carried by the support.

9. A brake comprising, in combination, a drum, an expansible floating friction device within the drum arranged to anchor at one end when the drum is turning in one direction and at the other end when the drum is turning in the other direction, a stationary anchor between the ends of the friction device, a support mounted to swing about an axis passing through the anchor, and a double cam carried by the support.

10. A brake comprising, in combination, a drum, an expansible floating friction device within the drum arranged to anchor at one end when the drum is turning in one direction and at the other end when the drum is turning in the other direction, a stationary anchor between the ends of the friction device, a support mounted to swing about an axis passing through the anchor, a brake-expanding device carried by the support, a shaft for operating said expanding device, and a universal joint connecting the shaft to the expanding device and permitting swinging movement of the support.

11. A brake comprising, in combination, a drum, an expansible floating friction device within the drum arranged to anchor at one end when the drum is turning in one direction and at the other end when the drum is turning in the other direction, a stationary anchor between the ends of the friction device, a support mounted to swing about an axis passing through the anchor, a brake-expanding device carried by the support, a shaft for operating said expanding device, and a universal joint connecting the shaft to the expanding device and permitting swinging movement of the support and also permitting swivelling movement of the entire brake.

12. A brake comprising, in combination, a drum, an expansible friction device within the drum arranged to anchor at one end when the drum is turning in one direction and at the other end when the drum is turning in the other direction, a lever swung by movement of the friction device in either direction, and means yieldingly resisting swinging of the lever and acting through the lever to center the friction device.

13. A brake comprising, in combination, a drum, a backing plate, an expansible friction device within the drum, a lever swung by relative movement of the friction device and the backing plate, and means yieldingly resisting swinging of the lever and acting through the lever to center the friction device.

14. A brake comprising, in combination, a drum, a backing plate, an expansible friction device within the drum, a lever pivoted on the friction device, means on the backing plate to rock the lever when the friction device is forced against the drum, and a spring resisting the rocking of the lever.

15. A brake comprising, in combination, a drum, a backing plate, an expansible friction device within the drum, a lever pivoted on the friction device, a fixed stop on the backing plate to rock the lever when the friction device is forced against the drum, and a spring resisting the rocking of the lever.

16. A brake comprising, in combination, a drum, a friction device within the drum shiftable slightly in opposite directions to wrap in either direction of drum rotation, a double lever rocked in one direction by shifting of the friction device in one direction and rocked in the same direction by shifting of the friction device in the other direction, and means yieldingly resisting rocking of the lever.

17. A brake comprising, in combination, a drum, a friction device within the drum shiftable slightly in opposite directions to wrap in either direction of drum rotation, a double lever, a pair of lever-engaging stops so arranged that the lever is rocked in one direction by shifting of the friction device in one direction and rocked in the same direction by shifting of the friction device in the other direction, and a spring yieldingly resisting rocking of the lever.

18. A brake comprising, in combination, a drum, a plurality of shoes within the drum, a floating pivot between adjacent ends of the shoes, a lever mounted on the pivot, a fixed stop engaging and rocking the lever, and a spring resisting rocking of the lever.

19. A brake comprising, in combination, a drum, a plurality of shoes within the drum shiftable slightly with the drum in either direction when applied, according to the direction of rotation of the drum, a floating connection between the shoes, and a single coil spring tensioned by shifting of the shoes in either direction and serving yieldingly to center the connection when the brake is released.

20. A brake comprising, in combination, a drum, a plurality of shoes within the drum shiftable slightly with the drum in either direction when applied, according to the direction of rotation of the drum, a floating connection between the shoes, a device mounted to shift with the shoes and moved with respect to the shoes by said shifting, and spring means cooperating with said device to center the connection when the brake is released.

21. A brake comprising, in combination, a drum, a plurality of shoes within the drum shiftable slightly with the drum in either direction when applied, according to the direction of rotation of the drum, a floating connection between the shoes, and a single spring tensioned by shifting of the shoes in either direction and acting on the floating connection at one side of the shoes yieldingly to center the shoes when the brake is released.

22. A brake comprising, in combination, a drum, a plurality of shoes within the drum, a floating pivot between adjacent ends of the shoes, a device engaging the pivot, and a spring connected to said device and tensioned by shifting of the device by movement of the pivot in either direction.

23. A brake comprising, in combination, a drum, a backing plate at the open side of the drum, a plurality of shoes in the drum, a floating pivot between adjacent ends of the shoes projecting at one side of the shoes, and means acting on the projecting part of the pivot yieldingly to resist movement of the pivot.

24. A brake comprising, in combination, a drum, a backing plate at the open side of the drum, a plurality of shoes in the drum, a floating pivot between adjacent ends of the shoes projecting at one side of the shoes through a relatively large opening in the backing plate, and parts carried by the projecting part of the pivot and lightly clamped against opposite sides of the backing plate.

25. A brake comprising, in combination, a drum, a backing plate at the open side of the drum, a plurality of shoes in the drum, a floating pivot between adjacent ends of the shoes projecting at one side of the shoes through a relatively large opening in the backing plate, and means acting on the part of the pivot between the shoes and the backing plate and yieldingly resisting movement of the pivot.

26. A brake comprising, in combination, a drum, a backing plate at the open side of the drum, a plurality of shoes in the drum, a floating pivot between adjacent ends of the shoes projecting at one side of the shoes through a relatively large opening in the backing plate, a centering device between the shoes and backing plate and acting on the pivot, and a spring tensioned by the centering device on movement of the pivot.

27. A brake comprising, in combination, a drum, a backing plate at the open side of the drum, a plurality of shoes in the drum, a floating pivot between adjacent ends of the shoes projecting at one side of the shoes through a relatively large opening in the backing plate, and a spring-operated centering device relatively narrow in width and arranged between the shoes and backing plate and acting on the pivot.

28. A brake comprising, in combination, a drum, a backing plate at the open side of the drum, a plurality of shoes within the drum having semi-cylindrical sockets in their adjacent ends, a pivot in said sockets projecting through a relatively large opening in the backing plate, a spring connecting the shoes and urging the sockets against opposite sides of the pivot, and means on the pivot engaging opposite sides of the backing plate to position the shoes laterally.

29. A brake comprising, in combination, a drum, a plurality of shoes within the drum having sockets at their adjacent ends, a pivot in said sockets, a spring connecting the shoes and urging the sockets against opposite sides of the pivot, and a mounting for the pivot permitting it to shift with the shoes.

In testimony whereof I have hereunto signed my name.

LUDGER ELIZÉ LA BRIE.